United States Patent
Murray

(10) Patent No.: US 7,480,323 B2
(45) Date of Patent: Jan. 20, 2009

(54) LASER TUBE WITH EXTERNAL ADJUSTABLE REACTANCE FOR A GAS DISCHARGE RF-EXCITED LASER

(75) Inventor: Michael W. Murray, Mukilteo, WA (US)

(73) Assignee: Synrad, Inc., Mukilteo, WA (US)

( * ) Notice: Subject to any disclaimer, the term of this patent is extended or adjusted under 35 U.S.C. 154(b) by 67 days.

(21) Appl. No.: 11/750,265

(22) Filed: May 17, 2007

(65) Prior Publication Data

US 2008/0285607 A1 Nov. 20, 2008

(51) Int. Cl.
*H01S 3/22* (2006.01)
(52) U.S. Cl. .............................. 372/55; 372/57; 372/61
(58) Field of Classification Search ................... 372/55, 372/57
See application file for complete search history.

(56) References Cited

U.S. PATENT DOCUMENTS

| | | |
|---|---|---|
| 3,919,656 A | 11/1975 | Sokal et al. |
| 4,169,251 A | 9/1979 | Laakmann |
| 4,443,877 A | 4/1984 | Chenausky et al. |
| 4,805,182 A | 2/1989 | Laakmann |
| 4,837,772 A | 6/1989 | Laakmann |
| 5,387,850 A | 2/1995 | Bray et al. |
| 5,525,871 A | 6/1996 | Bray et al. |
| 5,602,865 A | 2/1997 | Laakmann |
| 5,661,746 A | 8/1997 | Sukhman et al. |
| 5,953,360 A | 9/1999 | Vitruk et al. |
| 2003/0058913 A1* | 3/2003 | Shackleton et al. ........... 372/55 |
| 2007/0041418 A1* | 2/2007 | Laughman et al. ............ 372/55 |

OTHER PUBLICATIONS

Hall, Dennis R. and Hill, Christopher A., Radiofrequency-Discharged-Excited $CO_2$, Handbook of Molecular Laser, 1987, pp. 165-258, vol. 14, Marcel Dekkel, Inc. New York.
Ebert, Jan and Kazimierczuk, Marian, Class E high-Efficiency Tuned Power Oscillator, IEEE Journal of Solid-State Circuits, Apr. 1981, pp. 62-66, vol. SC-16, No. 2, Warsaw, Poland.
Sokal, Nathan O., Class-E RF Power Amplifiers, QEX, Jan./Feb. 2001, pp. 9-20, Lexington, MA.

* cited by examiner

*Primary Examiner*—Dung T Nguyen
(74) *Attorney, Agent, or Firm*—Edwards Angell Palmer & Dodge LLP

(57) ABSTRACT

A laser device is provided. The laser device includes a laser tube, oscillator circuitry, and a compensating reactive component that is arranged in parallel with the laser tube.

20 Claims, 9 Drawing Sheets

LASER TUBE WITH EXTERNAL ADJUSTABLE REACTANCE FOR A GAS DISCHARGE RF-EXCITED LASER

FIELD OF THE INVENTION

The invention is related to a radio-frequency (RF)-excited gas discharge lasers, and in particular but not exclusively, to laser tube with an external reactance for a gas discharge RF excited laser.

BACKGROUND OF THE INVENTION

A radio frequency (RF)-excited gas laser produces laser energy when a gas medium within the laser is excited by the application of RF energy between a pair of electrodes. One example of a gas laser is a carbon dioxide laser. RF-excited gas lasers have found many applications because of their compact size, reliability, and relative ease of manufacture.

BRIEF DESCRIPTION OF THE DRAWINGS

Non-limiting and non-exhaustive embodiments of the present invention are described with reference to the following drawings, in which.

DETAILED DESCRIPTION

Figure 1A:
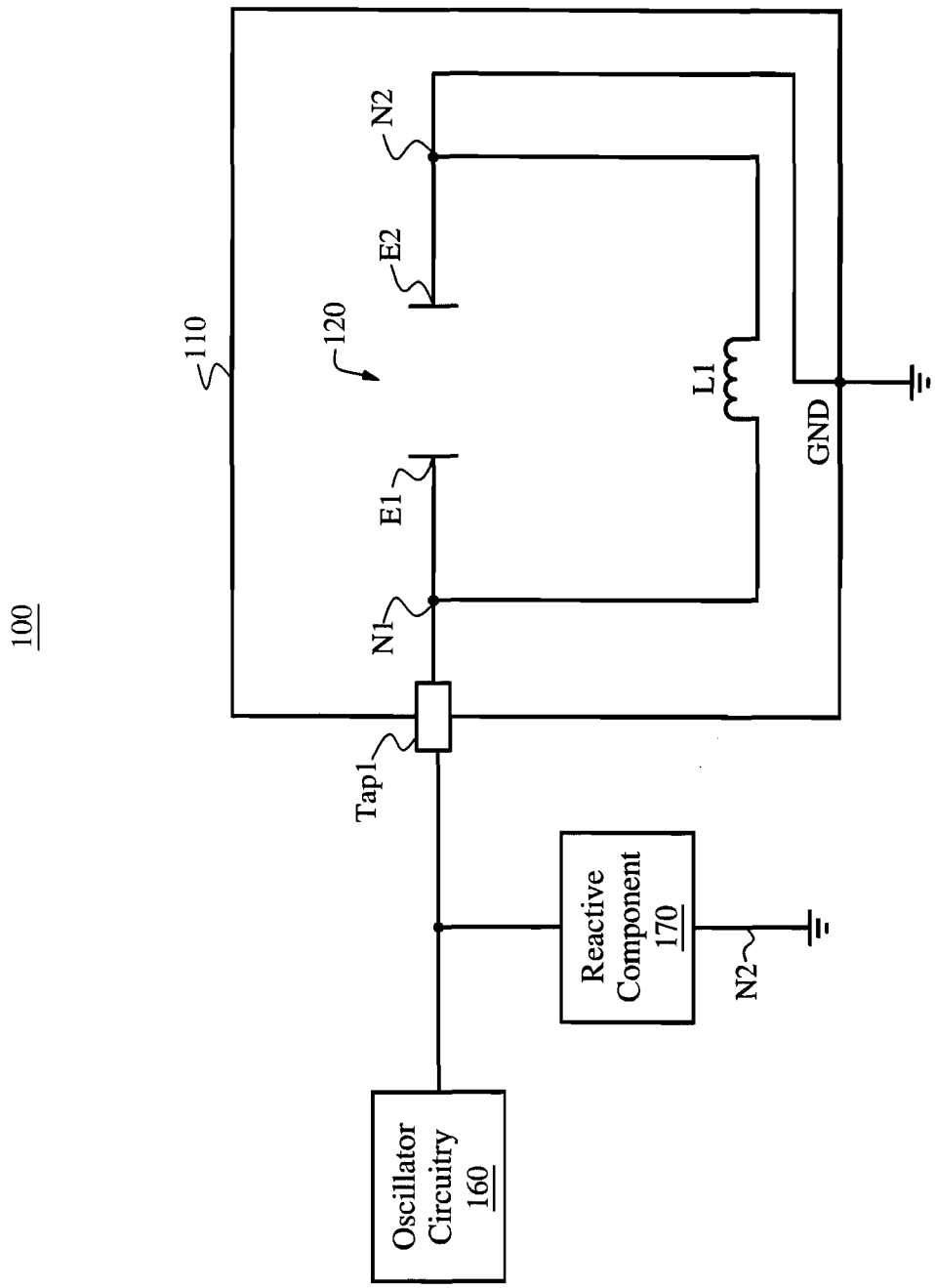
FIG. 1A shows a block diagram of an embodiment of a laser device.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa. Further, where an RF power grid tube may be used in place of a transistor, the scope of the words "grid", "plate", and "cathode" includes "gate", "drain", and "source" respectively, and vice versa.

Briefly stated, the invention is related to a laser device. The laser device includes a laser tube, oscillator circuitry, and a compensating reactive component that is arranged in parallel with the laser tube.

FIG. 1A shows a block diagram of an embodiment of laser device 100. Laser device 100 includes laser tube 110, oscillator circuitry 160, and reactive component 170. Laser tube 110 includes electrode E1, electrode E2, discharge region 120, and inductor circuit L1.

Laser tube 110 is a radio frequency (RF)-excited gas discharge laser tube. Virtually any RF-excitable gas discharge laser tube may be used for laser tube 110. Laser tube 110 has a ground input GND, and a first tap Tap1 connected to node N1. In one embodiment, as illustrated in FIG. 1, node N2 is GND. Electrode E1 is connected to node N1, and electrode E2 is connected to node N2. Also, there is a discharge region 120 between electrode E1 and electrode E2. A gas load, such as carbon dioxide or other type of lasing gas, fills discharge region 120 during operation of the laser. When excited by an RF signal provided by oscillator circuitry 160, an electric field develops between electrode E1 and electrode E2, causing plasma breakdown and therefore a discharge in the gas load in discharge region 120. Inductor circuit L1 includes one or more inductive coils that are each in parallel with the discharge region 110.

Oscillator circuitry 160 forms part or all of a power oscillator that provides RF energy to laser tube 110. The laser structure is resonant to the operating frequency $f_o$ of the coils (e.g. inductor L1). The resonant circuit is electrically connected to a feedback loop of a power device (not shown in FIG. 1A) that is part of oscillator circuitry 160.

Reactive component 170 is mounted external to laser tube 110. In some embodiments, the reactance of reactive component 170 may be pre-selected so as to compensate for the net reactance of the oscillator circuitry outside of laser tube 110, at the operating frequency $f_o$ of laser tube 110. In some embodiments, the operating frequency $f_o$ of laser tube 110 is equal to the resonant frequency of laser tube 110. In other embodiments, the operating frequency $f_o$ of laser tube 110 is relatively close to but slightly different than the resonant frequency of laser tube 110.

In some embodiments, the oscillation circuitry outside of laser tube 410 is net inductive. In these embodiments, reactive component 170 may be an adjustable capacitor. In other embodiments, the oscillation circuitry outside of laser tube 110 is net capacitive. In these embodiments, reactive component 170 may be an inductor.

Reactive component 170 is coupled in parallel with discharge region 120. In one embodiment, as illustrated in FIG. 1A, one electrode is coupled to tap Tap1 to receive RF power, and the other tap electrode is coupled to ground.

Laser tube 110 has a capacitance present between node N1 and the housing of the laser tube 110. This capacitance may be, at the very least, parasitic due to insulating structural supports for the electrodes and the free space between the electrodes and the housing. In some embodiments, this capacitance may be deliberately increased to increase the Q-factor of the laser tube. The parallel combination of this capacitance and L1 determines the resonant frequency of laser tube 110.

Figure 1B:
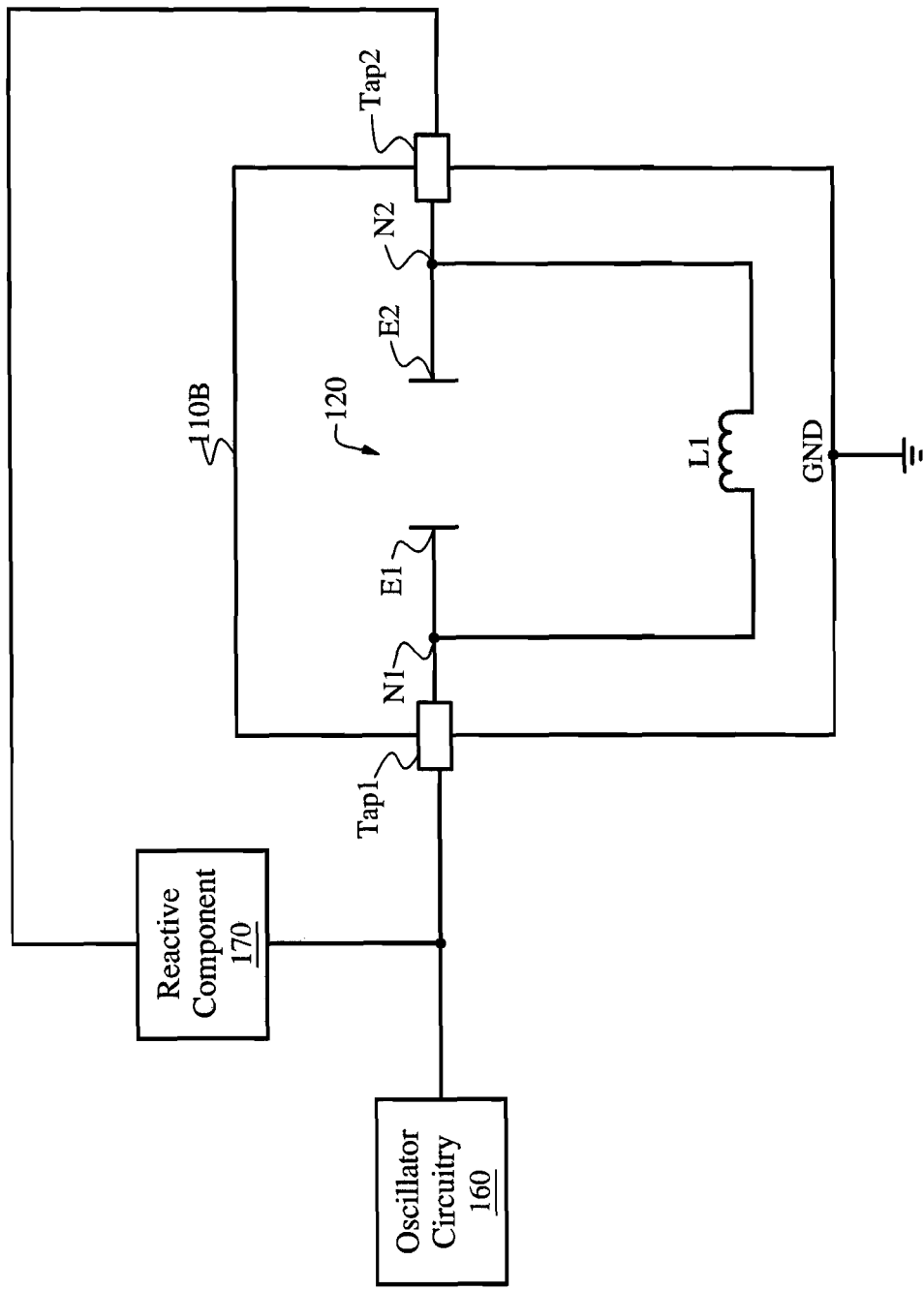
FIG. 1B shows a block diagram of an embodiment of the laser device of FIG. 1A.

FIG. 1B shows a block diagram of an embodiment of laser device 100B, which may be employed as an embodiment of laser device 100 of FIG. 1A. Laser device 100B is similar to laser device 100A, except that laser tube 110B of FIG. 1B has two taps, and electrode E2 is coupled to second tap Tap2 rather than ground.

Like in laser device 100, reactive component 170 is coupled in parallel with discharge region 120. However, in laser device 100B, since the electrode E2 is coupled to the second tap, reactive component 170 is coupled between the first tap Tap1 and the second tap Tap2.

In one embodiment, laser tube 110 has a capacitance present between node N1 and the housing of the laser tube 110 (as discussed above with regard to FIG. 1A), and another capacitance between node N2 and the housing of laser tube 110. The series combination of these two capacitances resonates in parallel with L1 at the resonant frequency of laser tube 110.

Figure 2:
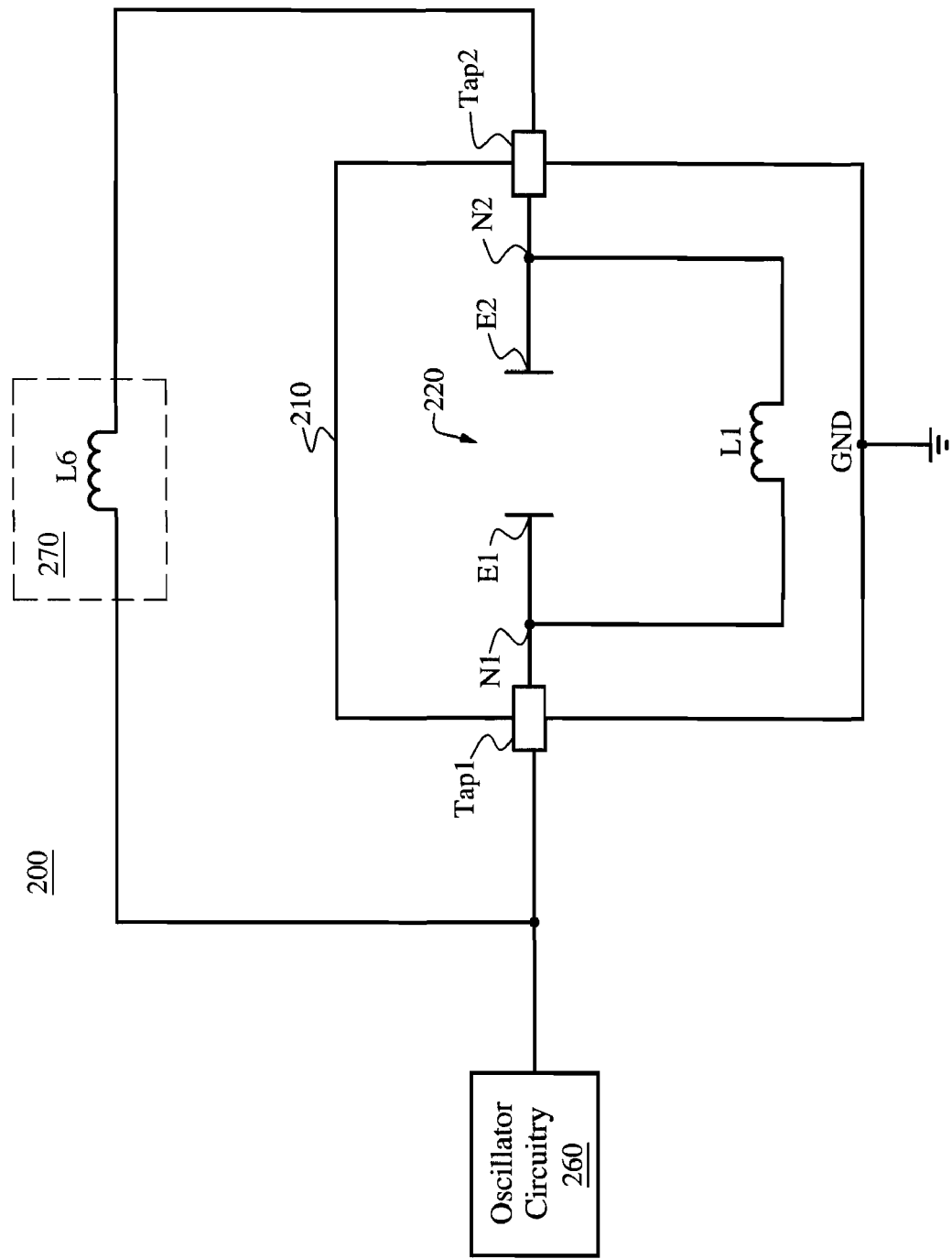
FIG. 2 illustrates a block diagram of an embodiment of the laser device of FIG. 1B.

FIG. 2 illustrates a block diagram of an embodiment of laser device 200, which may be employed as an embodiment of laser device 100B of FIG. 1B. In laser device 200, reactive component 270 is an inductor (L6).

Inductor L6 is mounted external to laser tube 210. Inductor L6 is adjustable while the laser is operating. In one embodiment, L6 is an air-coiled inductor with an inductance that may be adjusted by physically compressing or stretching the coil, thus allowing the inductance to be adjusted by about 5% to 10% from the nominal inductance of the coil. In other embodiments, the inductance is adjustable in other ways.

The inductance value of inductor circuit L1 may vary from part-to-part. However, inductor L1 is inside the laser tube box 210 and is therefore inaccessible after laser tube 210 has been assembled. However, external inductor L6 is accessible outside of the laser tube, and therefore may be used to fine tune the total equivalent inductance between nodes N1 and N2, in order to fine-tune the frequency and the longitudinal RF voltage distribution along the gas discharge length of the laser for optimal laser performance. Taps Tap1 and tap2 may be placed on the laser tube 210 in such a way that, when the inductance between nodes N1 and N2 is properly fined-tuned by adjusting inductor L6, a uniform voltage standing wave occurs in laser tube 210. This results in improved laser performance since the electric field is therefore substantially the same everywhere in laser tube 210.

Figure 3:
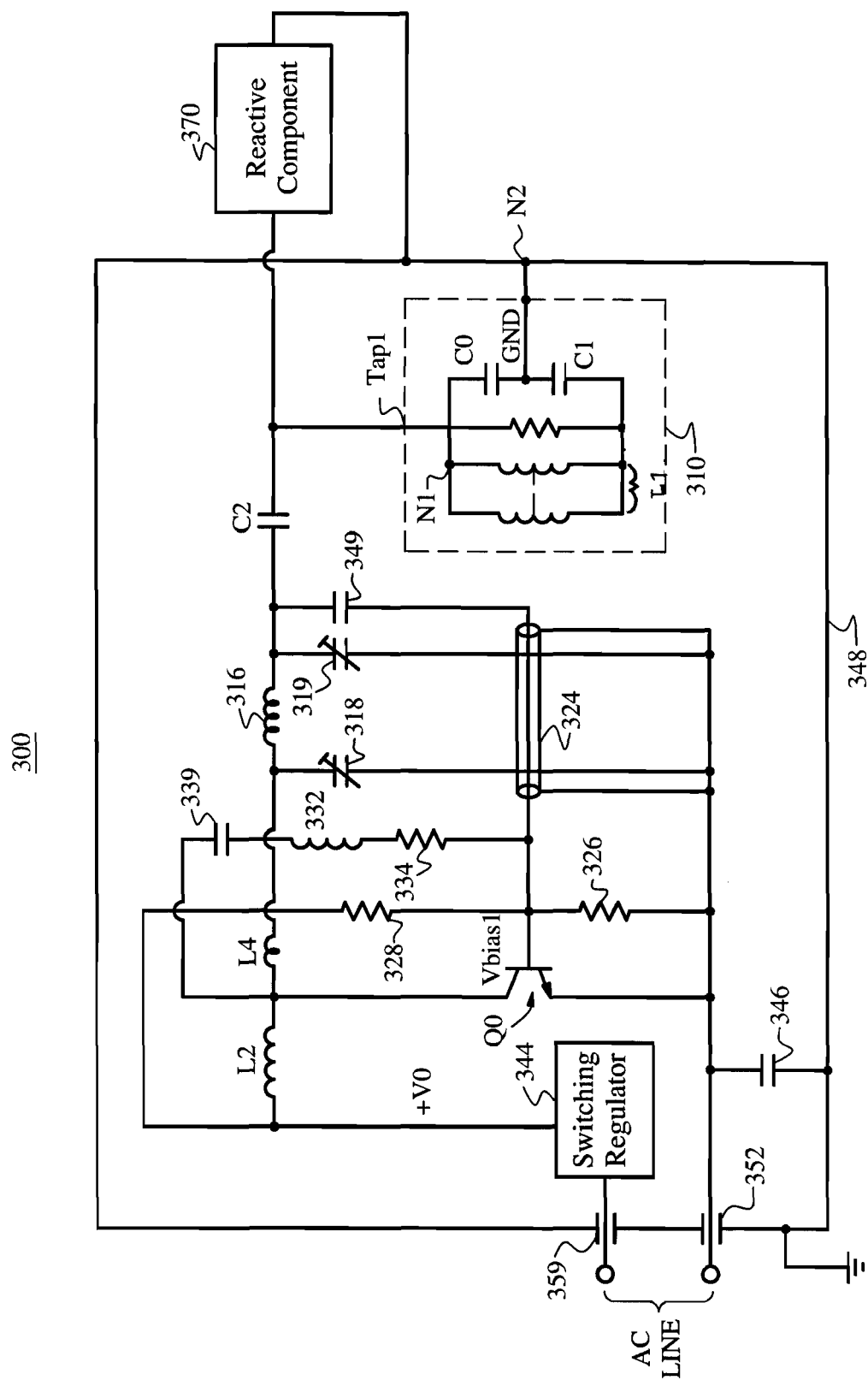
FIG. 3 illustrates a block diagram of an embodiment of the laser device of FIG. 2.

FIG. 3 illustrates a block diagram of an embodiment of laser device 300, which may be employed as an embodiment of laser device 100 of FIG. 1A. Laser device 300 further includes switching regulator 344, filters 352 and 359, capacitor 346, enclosure 348, and switching regulator 344. In laser device 300, the oscillation circuitry includes inductors L2, L4, 332, and 316; capacitors C2, 318, 319, 339, and 349; cable 324; and resistors 326, 328, and 334.

The parallel resonant circuit of FIG. 3 is made up of the capacity to ground of each of the two discharge electrodes and one or more shunt inductances placed across the discharge section, as a lumped constant or transmission line structure. A lasing gas mixture, containing, for example, CO or $CO_2$, is contained within the discharge section.

Cable 324 of FIG. 3 represents a quarter wave impedance transformer made from coaxial cable to transform the base drive impedance of the transistor. This splits about one-tenth of the output power back to the base of transistor Q0 in a feedback mode.

Resistors 26 and 28 provide bias signal Vbias1 for quiescent bias in order to provide the initial grain for the start of oscillations. These can be wire-wound resistances doubling as RF chokes. Capacitor 339, inductor 332, and resistor 334 comprise a damping network which prevents parasitic oscillations at low frequencies by providing strong negative feedback. The network has essentially no effect at the operating frequency. Coil L2 is an RF choke at the operating frequency and applies DC voltage to transistor Q0.

Upon applying $V_O$ from switching regulator 344, transistor Q0 operates to provide a relatively large amount of gain at the resonant frequency of the laser. Oscillations start in the oscillator circuit and build up until breakdown of the lasing gas occurs within the discharge section.

In one embodiment, laser device 300 includes switching regulator 344, which serves as an AC to DC power converter and can be of the conventional simple series inductance, step-down type. The regulator input and output are not isolated and the entire RF circuit rides on the line voltage. The capacitors C2 and 346 provide grounding for the RF voltage without causing excessive line current ground leakage because of the high operating frequency.

Enclosure 348 for the laser device 300 provides RF shielding, with feedthrough filters 359 and 352 providing lead filtering.

Laser device 300 is an embodiment of laser device 100B of FIG. 1B in which the oscillator circuitry 160 is an oscillator circuit. However, in other embodiments, as illustrated in FIG. 4, the laser tube itself may form the feedback pi-network of the oscillator.

Figure 4:
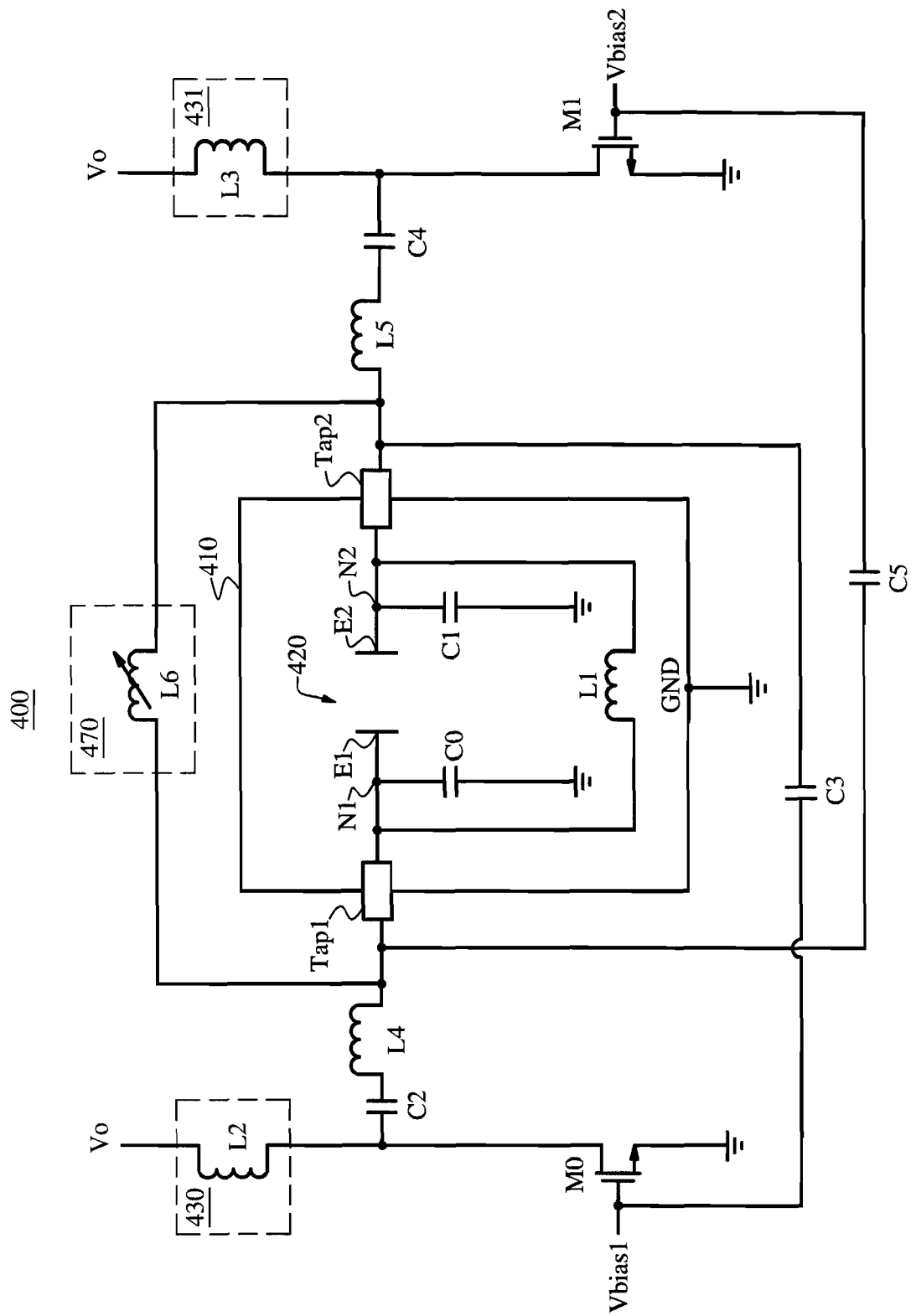
FIG. 4 shows a schematic diagram of another embodiment of the laser device of FIG. 2.

FIG. 4 shows a schematic diagram of an embodiment of laser device 400, which may be employed as an embodiment of laser device 200 of FIG. 2. Laser device 400 further includes RF chokes 430 and 431. In laser device 400, the oscillator circuitry includes capacitor C2, capacitor C3, and transistor M0 inductor L4, inductor L5, transistor M1, capacitor C4, and capacitor C5. In one embodiment, reactive component 470 includes inductor L6. RF choke 430 includes inductor L2. RF choke 431 includes inductor L3.

Capacitance C0 represents the lumped equivalent capacitance at node N1, and capacitance C1 represents the lumped equivalent capacitance at node N2.

Oscillator 400 is arranged as a dual Colpitts oscillator, except that laser tube 410 is the feedback pi-network of the dual Colpitts oscillator. Laser tube 410 is accordingly arranged for self-oscillation for RF excitation where laser tube 410 is part of the oscillator.

RF chokes 430 and 431 each provide DC voltage at its output at the operating frequency. RF choke 430 is arranged to allow DC current to flow to the drain of transistor M0 without letting any of the RF current to flow backward into the power supply. Capacitors C2 and C4 are DC blocking capacitors. Capacitor C3 and C5 are also DC blocking capacitors, and act as feedback circuits. Capacitor C3 provides a feedback signal to the gate of transistor M0 based on output the signal at Tap2, but prevents full power from going to the gate of transistor M0. Similarly, capacitor C5 provides a feedback signal to the gate of transistor M1 based on output the signal at Tap1, but prevents full power from going to the gate of transistor M1.

Although transistors M0 and M1 are used as the active devices in one embodiment, in other embodiments, a different type of active device may be employed, such as a vacuum tube triode, tetrode, pentode, or the like.

Bias voltages Vbias1 and Vbias2 are applied to the gate of transistors M0 and M1 respectively at a voltage close to the threshold voltage of the transistor to ensure that oscillation begins.

FIG. 4 illustrates a dual Colpitts oscillator. In other embodiments, a single Colpitts oscillator may be employed.

Figure 5:
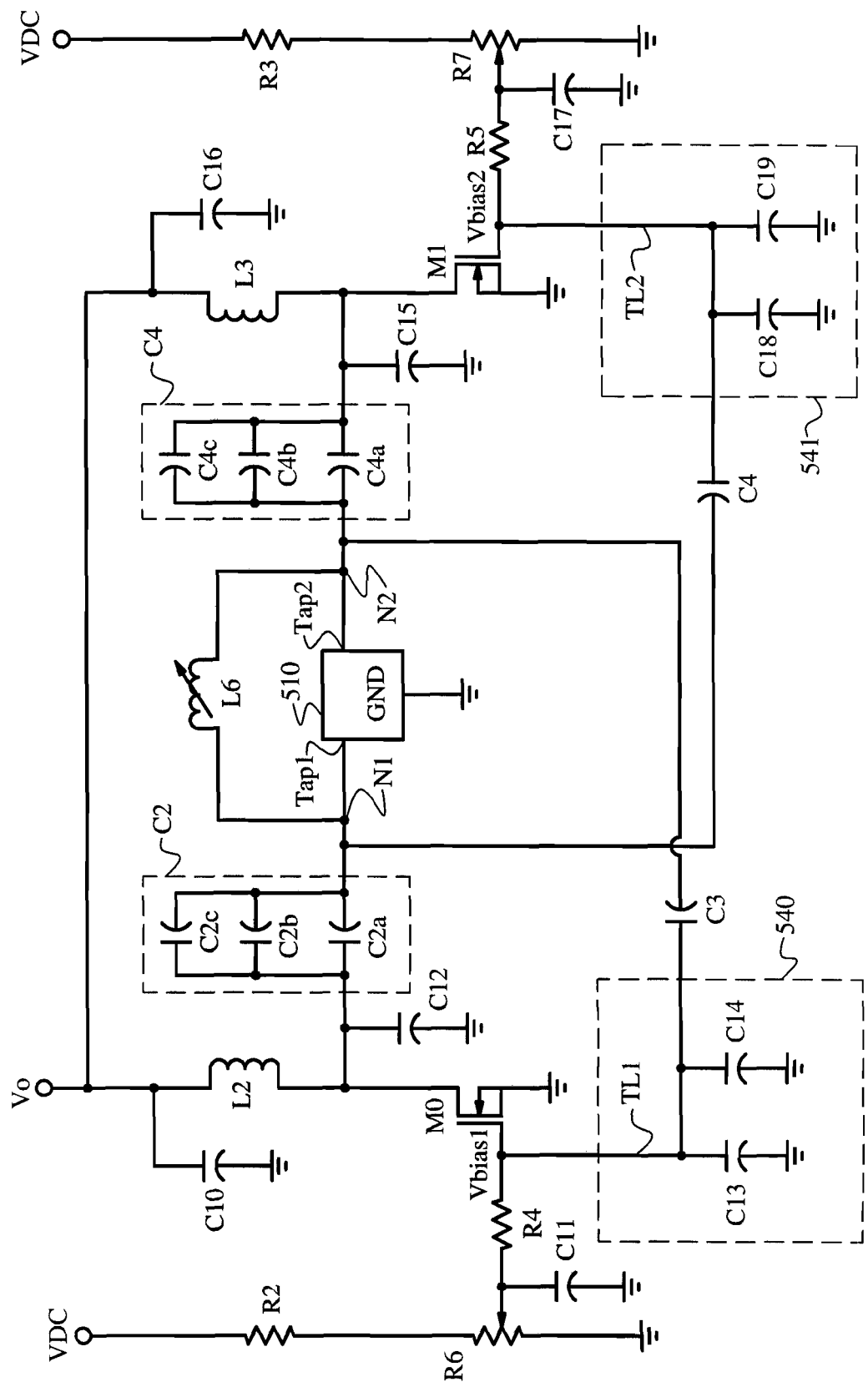
FIG. 5 schematically illustrates of an embodiment of the laser device of FIG. 4.

FIG. 5 schematically illustrates of an embodiment of laser device 500, which may be employed as an embodiment of laser device 400 of FIG. 4. Laser device 500 further includes resistors R2-R5, adjustable resistors R6 and R7, and capacitors C10-C12 and C15-C17. Phase-shifting network 540 includes capacitor C13, capacitor C14, and transmission line TL1. Phase-shifting network 541 includes capacitor C18, capacitor C19, and transmission line TL2. Capacitor C2 includes capacitors C2a-C2c. Resistors R2, R4, adjustable resistor R6, and capacitor C11 operate to provide bias voltage Vbias1 from voltage VDC to bias the gate of transistor M0. Similarly, Resistors R3, R5, adjustable resistor R7, and capacitor C17 operate to provide bias voltage Vbias2 from voltage VDC to bias the gate of transistor M1.

A simple Colpitts oscillator has a phase shift of 180 degrees. To achieve class E operation, a phase of 196 degrees is employed. In laser device 500, phase-shifting network 540 includes reactive components for creating an overall phase shift of approximately 196 degrees as measured between the drain and gate of one of the active devices the active device (e.g. transistor M0) of laser device 500. Phase-shifting network 541 includes reactive components for creating an overall phase shift of approximately 196 degrees as measured between the drain and gate of the other active device (e.g. transistor M1) of laser device 500.

Figure 6A:
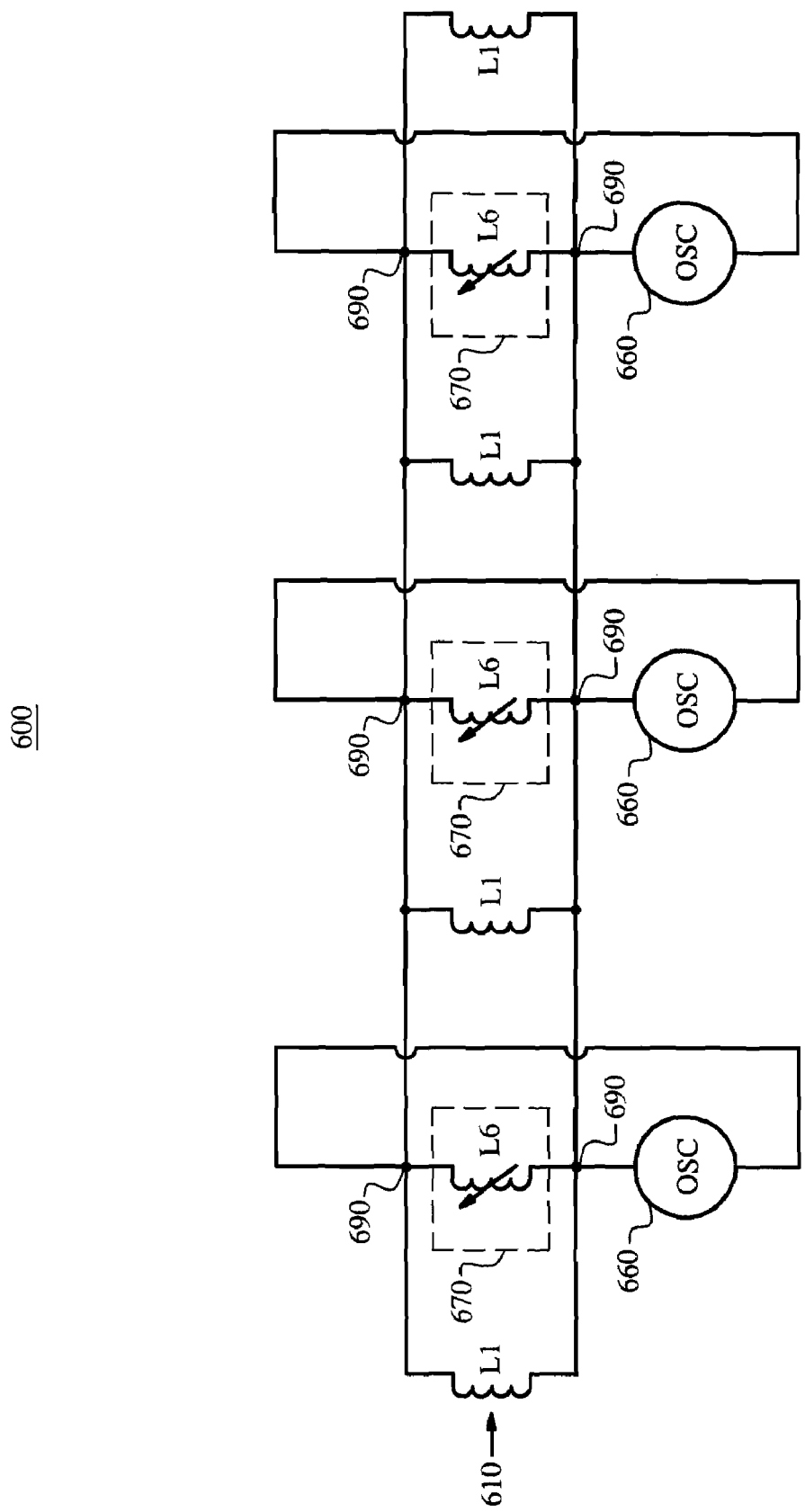
FIG. 6A shows a block diagram of an embodiment of the laser device of FIG. 2.

FIG. 6A shows a block diagram of an embodiment of laser device 600, which may be employed as an embodiment of laser device 100 of FIG. 1. In this embodiment, the laser tube includes additional pair of RF connections (i.e. taps) 690 along the length of the laser tube at positions that correspond to the location of internal inductors. In this embodiment, the oscillators lock together at the one frequency although not necessarily at the same phase. In this embodiment, RF power input to the laser tube may be substantially increased. FIG. 6A illustrates an embodiment with a single Colpitts oscillator at each pair of taps 690.

It is important to note that the rectangle 610 in FIG. 6A represents the laser tube. Inductive coils L1 are distributed uniformly on the length of laser tube 610. In this way, the RF voltage is substantially constant throughout laser tube 610, so that the laser tube operates in evanescent mode. In this way, uniform distribution of voltage and excitation of gas along the full length of laser tube 610 is achieved. The longitudinal gas discharge uniformity may be optimized by adjusting the inductance of external inductive coils L6.

Internal inductive coils L1 are distributed along the length of laser tube 610. In one embodiment, internal inductive coils L1 are distributed uniformly along the length of laser tube 610. Each of the reactive components 670 is coupled between a separate corresponding pairs of taps 690. Each pair of taps 690 includes a first tap that is coupled to the first electrode E1 (not shown in FIG. 6A) and a second tap that is coupled to the first electrode E2 (not shown in FIG. 6A). In the embodiment illustrated in FIG. 6, each of the oscillator circuits 660 is coupled to a separate corresponding pairs of taps. Also, in this embodiment, each of the oscillator circuits 660 provides RF power to at least one of the taps that it is coupled to. RF power to the laser tube is substantially increased by have multiple oscillators circuits 660 distributed along the length of laser tube 610, rather than just one. The laser structure is resonant to the operating frequency $f_o$ of inductive coils L1.

In some embodiments, one or more of the oscillator circuits 660 may be replaced with RF power amplifiers.

Figure 6B:
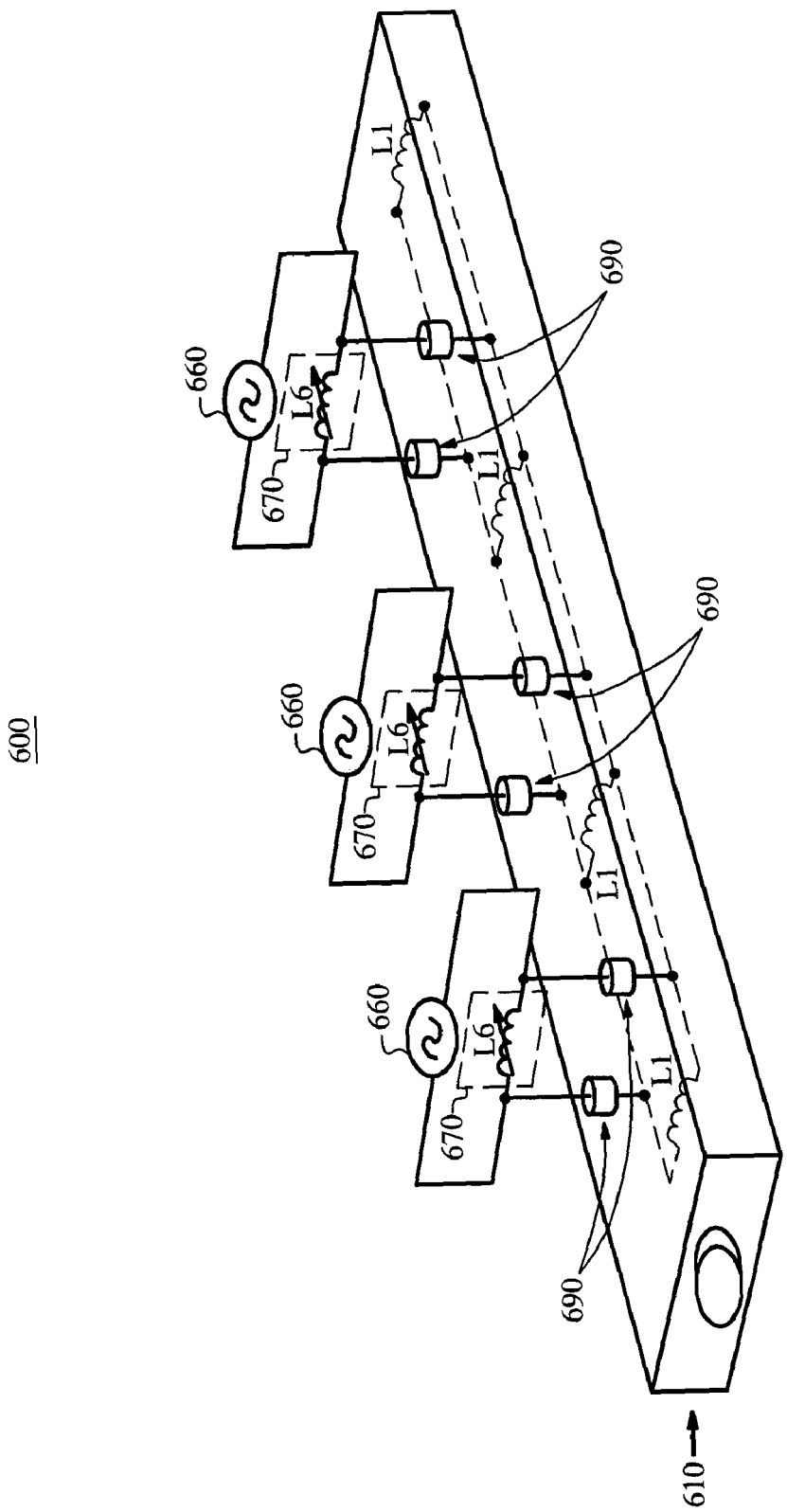
FIG. 6B shows a three-dimensional perspective of an embodiment of the laser device of FIG. 6A.

FIG. 6B shows a three-dimensional perspective of an embodiment of laser device 600.

Figure 7:
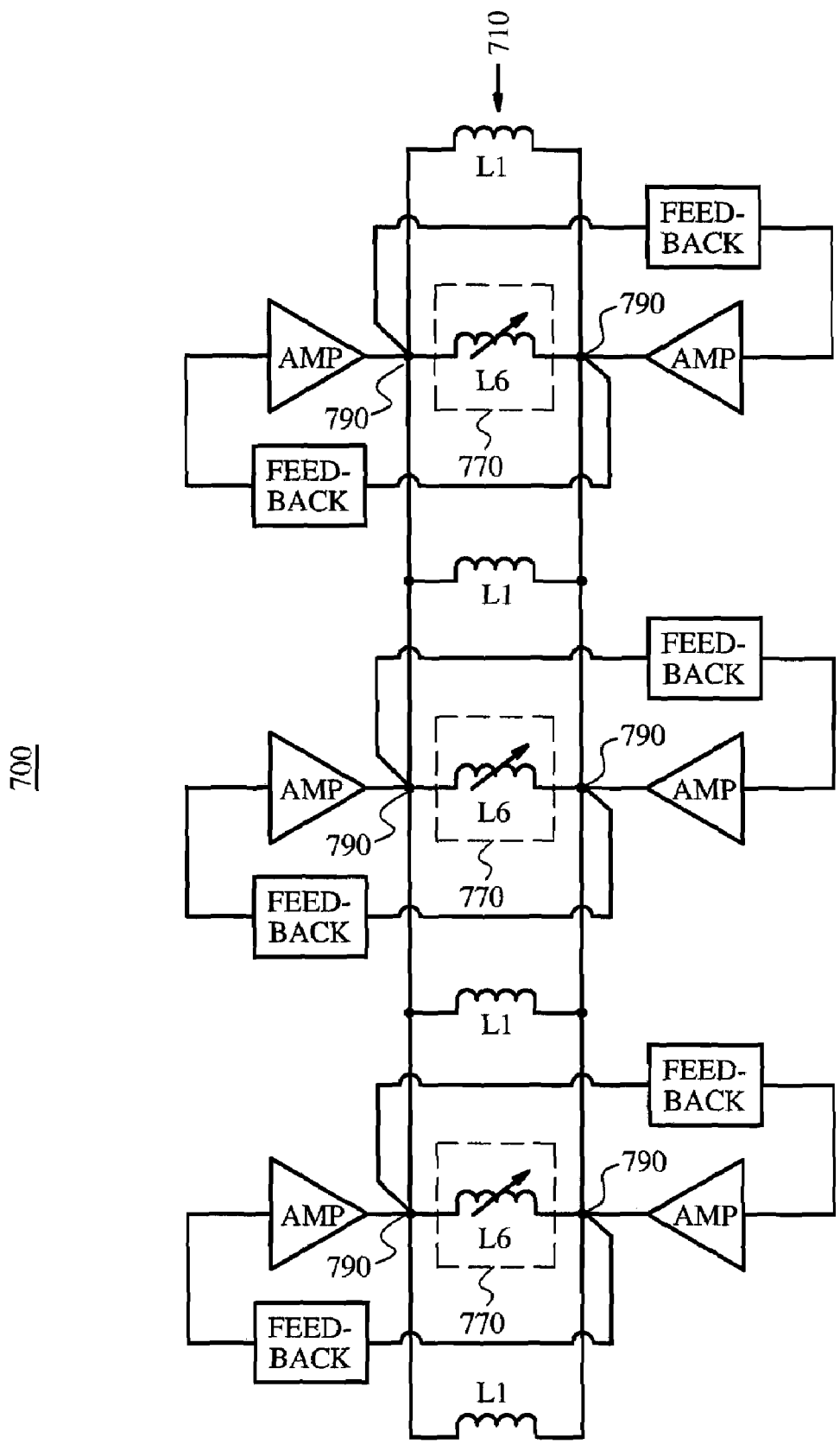
FIG. 7 illustrates a block diagram of an embodiment of the laser device of FIG. 6A, arranged in accordance with aspects of the present invention.

FIG. 7 illustrates an embodiment of laser device 700, which may be employed as an embodiment of laser device 600 of FIG. 6A. FIG. 7 illustrates an embodiment with a dual Colpitts oscillator at each pair of taps 790.

In one embodiment, the reactance of each of the adjustable reactive devices 770 may be pre-determined according to the following calculations.

In this example, $L_{tap}$, is the inductance of each of coil L1 that is placed between the taps of a dual power oscillator on a laser tube to produce a uniform voltage distribution along the length of the tube for RF operating frequency, $f_o$, while compensating for the dual power oscillator circuit capacitance $C_{osc}$ that are in shunt with each tap. The total capacitance measured at either tap of the laser tube is $C_{tap}$. (Each of the lumped capacitances C0 and C1 is $C_{tap}/2$; the parallel capacitance of C0 and C1 is measured as $C_{tap}$). The resonant frequency of the tube with only the N internal coils and none of the M dual power oscillators installed is $f_{tap}$. The inductance value of each of the N internal coils is $L_{coil}$. Adding M coils of inductance value, $L_{coil}$, across the taps would raise the resonant frequency to $f_o$ if the capacitances, $C_{osc}$, were not present. Therefore an additional inductance, $L_{osc}$, must be added across each of the taps as well to eliminate the power oscillator circuit capacitance. Capacitances $C_{oss}$ and $C_{iss}$ represent the output and input capacitance, respectively, of each of the power devices. In one embodiment of laser device 700, an oscillator as shown in FIG. 6A is at each of the taps. For example, in FIG. 5, $C_{oss}$ is the capacitance at the drain of transistor M0, $C_{oss}$ is also the capacitance at the drain of transistor M1, $C_{iss}$ is the capacitance at the gate of transistor M0, and $C_{iss}$ is also the capacitance at the gate of transistor M1. In one example embodiment, N=4 and M=3.

$$f_{tap} := f_0 \cdot \sqrt{\frac{N}{M+M}}$$

$$L_{coil} := N \cdot \left[ (2 \cdot \pi \cdot f_{tap})^2 \cdot \frac{C_{tap}}{4} \right]^{-1}$$

As previously discussed, $L_{coil}$ is the inductance value of each of the N individual coils. $L_{coil}$ is pre-determined by the designer as the having an inductance corresponding to the reactance (at frequency $f_{tap}$) conjugate to the total equivalent capacitance inside the tube at frequency $f_{tap}$. The parallel combination of the N coils is resonant with the series combination of C0 and C1 at frequency $f_{tap}$. The capacitance at C0 and C1 is $C_{tap}/2$ each, and the series combination of C0 and C1 is $C_{tap}/4$.

$$C_{osc} := \frac{C_2 \cdot (C_{12} + C_{oss})}{C_2 + (C_{12} + C_{oss})} + \frac{C_{29} \cdot (C_{17} + C_8 + C_{iss})}{C_{29} + (C_{17} + C_{18} + C_{iss})}$$

$$L_{osc} := \left[(2\cdot\pi\cdot f_0)^2 \cdot \frac{C_{osc}}{2}\right]^{-1}$$

$C_{osc}$ is the total equivalent capacitance of each single oscillator. The total equivalent capacitance of the dual oscillator is $C_{osc}/2$. If only a single Colpitts oscillator were used, the total equivalent capacitance of the oscillator would be simply $C_{osc}$. The inductance $L_{osc}$ is pre-determined as the inductance corresponding to the reactance conjugate of total equivalent capacitance of the dual oscillator at the operation frequency $f_o$.

In one embodiment of the invention, $L_{osc}$ as given in the above equation is the inductance that is used for inductor L6.

In other embodiments, external inductors L6 may also be used as substitute positions for locations of some of the inductors L1 internal to the laser tube. For example, in the embodiment described above, there are four internal coils and three external inductors. The external inductor values may be selected in such a way that they function in a similar manner to the internal inductors, and also provide compensation for the oscillator circuit. In this way, even though there are only four internal coils, it is as if there are seven internal coils. The four internal coils are evenly spaced within the laser tube. Each pair of taps, with the corresponding external inductor L6, is placed evenly between two adjacent pairs of internal coils, which amounts to seven uniformly distributed coils, each having an inductance of $L_{coil}$.

In this embodiment, the inductance $L_{tap}$ for each inductor L6 is pre-determined as the parallel combination of $L_{coil}$ and $L_{osc}$.

$$L_{tap} := \frac{L_{osc}\cdot L_{coil}}{L_{osc} + L_{coil}}$$

In this embodiment, the $L_{tap}$ value calculated above is used as the nominal inductance for each of the inductors L6. During operation of the laser, the inductors L6 are further adjusted to achieve maximum laser output.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A device for an RF-excited gas laser, comprising:
    a laser tube, including:
        a discharge region;
        a first electrode;
        a second electrode, wherein the first and second electrodes are disposed on opposite sides of the discharge region, the first electrode is coupled to a first node, and wherein the second electrode is coupled to a second node; and
        an inductive coil that is coupled between the first node and the second node;
    a reactive component that is external to the laser tube, wherein the reactive component is coupled between the first node and the second node; and
    oscillator circuitry that is coupled to the first electrode, wherein the oscillator circuitry is arranged to provide radio-frequency (RF) power to at least the first electrode.

2. The device of claim 1, wherein the reactive component is one or more inductors.

3. The device of claim 1, wherein the reactive component is one or more capacitors.

4. The device of claim 1, wherein the second electrode is connected to ground, and wherein the first component is connected between the first node and ground.

5. The device of claim 1, wherein the laser tube further includes a first tap that is coupled to the first node, a second tap that is coupled to the second node, the oscillator circuitry is coupled to the first tap and the second tap, and wherein the reactive component is coupled between the first tap and the second tap.

6. The device of claim 1, wherein the reactive component has an adjustable inductance or an adjustable capacitance.

7. The device of claim 1, wherein the reactive component has an adjustable inductance, the reactive component includes an inductor having a plurality of coils, the inductance of the inductor is adjustable by compressing the coils, the inductance of the inductor is further adjustable by stretching the coils, and wherein the inductor is mounted externally to the laser tube such that the coils are accessible outside of the laser tube.

8. The device of claim 1, wherein the reactive component has a reactance that is approximately conjugate to the net equivalent reactance of the oscillator circuitry at a frequency of operation of the laser tube.

9. The device of claim 8, wherein the frequency of operation of the laser tube is approximately equal to a resonant frequency of the laser tube.

10. The device of claim 1, wherein the reactive component has an inductance that is approximately equal to a parallel combination of: (1) an inductance of the inductive coil of the laser tube, and (2) an inductance corresponding to the conjugate of the net equivalent reactance of the oscillator circuit at the frequency of operation of the laser tube.

11. The device of claim 10, wherein the frequency of operation of the laser tube is approximately equal to a resonant frequency of the laser tube.

12. The device of claim 1, further comprising at least one additional reactive components external to the laser tube, wherein the reactive component and the at least one additional active components comprise a plurality of reactive component that are uniformly distributed along the outside of the laser tube.

13. The device of claim 12, wherein
    the laser tube further includes:
        a plurality of additional pairs of electrodes; and
        additional inductive coils including an additional inductive coil for each of the additional pairs of electrodes coupled between the pair of electrodes, wherein the inductive coil and the additional inductive coils comprise a plurality of internal inductive coils;
    wherein each of the reactive components is an external inductive coil, wherein each of the external inductive coils and the plurality of internal inductive coils comprise a plurality of inductive coils, and wherein the plurality of inductive coils is uniformly distributed along a length of the laser tube.

14. The device of claim 13, wherein each of the plurality of internal inductive coils has approximately the same inductance as each other, and wherein each of the external coils has an inductance that is approximately equal to a parallel combination of: (1) the inductance of one of the internal inductive coils; and (2) an inductance corresponding to the conjugate of the net equivalent capacitance of the oscillator circuit at the frequency of operation of the laser tube.

15. A device for an RF-excited gas laser, comprising:
  a laser tube, including:
    a discharge region;
    a first electrode;
    a second electrode, wherein the first and second electrodes are disposed on opposite sides of the discharge region, and wherein the first electrode is coupled to a first node, the second electrode is coupled to a second node;
    a first tap that is coupled to the first node;
    a second tap that is coupled to the second node; and
    a plurality of inductive coils that are coupled between the first node and the second node;
  a reactive component that is external to the laser tube, wherein the reactive component is coupled between the first tap and the second tap;
  oscillator circuitry that is coupled to the first electrode, wherein the oscillator circuit is coupled to the first tap and the second tap, and wherein the oscillator circuitry is arranged to provide radio-frequency (RF) power to at least the first electrode.

16. The device of claim 15, wherein the reactive component has an adjustable inductance, the reactive component includes an inductor having a plurality of coils, the inductance of inductor is adjustable by compressing the coils, the inductance of the inductor is adjustable by expanding the coils, and wherein the inductor is mounted externally to the laser tube such that the coils are accessible outside of the laser tube.

17. A method for laser generation, comprising:
  generating a laser by providing RF power to a gas laser tube, wherein the gas laser tube includes a discharge region and a plurality of coils in parallel with the discharge region; and
  while the laser is being generated, at an operating frequency of the laser, adjusting a reactance of a reactive component that is external to the laser tube and that is in parallel with the discharge region of the laser tube.

18. The method of claim 17, wherein the reactive component is one or more inductors.

19. The method of claim 17, wherein the reactive component is one or more capacitors.

20. The method of claim 17, wherein the reactive component includes an inductive coil, and wherein adjusting the reactive component includes at least one or compressing the inductive coil or stretching the inductive coil.

* * * * *